(12) United States Patent
Kamiyama et al.

(10) Patent No.: US 6,455,647 B1
(45) Date of Patent: Sep. 24, 2002

(54) SOLID CATALYST FOR OLEFIN POLYMERIZATION AND PROCESS FOR PRODUCING OLEFIN POLYMER WITH THE SAME

(75) Inventors: Sakae Kamiyama, Chiba; Toshifumi Takemori, Ichihara; Minoru Iijima, Ichihara; Yukiko Hane, Ichihara; Shigeharu Yamamoto, Yotsukaido, all of (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/581,042

(22) PCT Filed: Apr. 12, 1999

(86) PCT No.: PCT/JP99/01927
§ 371 (c)(1),
(2), (4) Date: Jun. 8, 2000

(87) PCT Pub. No.: WO00/23482
PCT Pub. Date: Apr. 27, 2000

(30) Foreign Application Priority Data

Oct. 19, 1998 (JP) .......................................... 10-296535

(51) Int. Cl.[7] .................................................. C08F 4/42
(52) U.S. Cl. ..................... 526/124.2; 526/160; 526/943; 526/348; 526/125.1; 502/103; 502/107; 502/226; 502/152
(58) Field of Search ................................ 526/160, 943, 526/348, 124.21, 125.11; 502/103, 107, 226, 152

(56) References Cited

U.S. PATENT DOCUMENTS 5,439,662 A * 8/1995 Spitz et al. ................. 423/497

FOREIGN PATENT DOCUMENTS

| JP | 3-210307   | * | 9/1991 |
|----|------------|---|--------|
| JP | A-3-210307 |   | 9/1991 |
| JP | A-4-211404 |   | 8/1992 |
| JP | A-4-211405 |   | 8/1992 |
| JP | A-5-255432 |   | 10/1993 |
| JP | A-6-256411 |   | 9/1994 |
| JP | A-7-268029 |   | 10/1995 |
| JP | 7-268029   | * | 10/1995 |
| JP | A-8-176225 |   | 7/1996 |

OTHER PUBLICATIONS

Kirk–Othmer Encyclopedia of Chemical Technology, 3rd Edition, vol. 14, p. 622 (1981).*

* cited by examiner

Primary Examiner—David W. Wu
Assistant Examiner—Ling-Siu Choi
(74) Attorney, Agent, or Firm—Oliff & Berridge, PLC

(57) ABSTRACT

The present invention relates to a solid catalyst (D) for olefin polymerization comprising a magnesium-containing solid component (A) carrying thereon an organoaluminum-oxy compound (B) and a metallocene compound (C), the magnesium-containing compound (A) being obtained by heat treating a magnesium compound represented by the general formula: $MgX_2 \cdot nH_2O$ where X represents a halogen atom and n is an integer of 1 to 12, and to a method of producing an olefinic polymer using the catalyst. In the case where the above solid catalyst for olefin polymerization is used, catalyst activity, particularly activity per solid catalyst, is high. Therefore, a deashing treatment step such as catalyst removal can be omitted. Further, the olefinic polymer produced has a narrow molecular weight distribution, and in the case of a copolymer, its monomer composition is uniform.

12 Claims, No Drawings

SOLID CATALYST FOR OLEFIN POLYMERIZATION AND PROCESS FOR PRODUCING OLEFIN POLYMER WITH THE SAME

TECHNICAL FIELD

The present invention relates to a solid catalyst for olefin polymerization and a method for producing an olefinic polymer using the solid catalyst. More specifically, the invention relates to a solid catalyst for olefin polymerization that does not require deashing treatment because of having high polymerization activity, and provides a polymer having a narrow molecular weight distribution, and a method for producing an olefinic polymer, comprising homopolymerizing or copolymerizing an olefin using the solid catalyst.

BACKGROUND ART

Kaminsky type catalyst that has received attention as a general purpose catalyst for polyolefin production in recent years has the characteristics of, for example, providing a polyolefin that has high activity and a narrow molecular weight distribution and giving a polymer uniform in composition in the case of using the same in copolymerization. However, since this catalyst is a homogeneous catalyst, polymer particles produced are in a form of a fine powder and this makes it difficult to handle and also causes fouling. For this reason, it is practically impossible to apply the catalyst to a slurry polymerization or a gas phase polymerization method, which is a main process in polyolefin production.

An attempt has been made to have a solid carrier carry at least one component of a metallocene compound and an organoaluminum-oxy compound in order to solve those problems.

For example, Japanese Patent Application Laid-open No. Hei 6-256411 discloses a method of using as a carrier various metal salts such as magnesium carbonate, magnesium hydroxide or magnesium sulfate, and Japanese Patent Application Laid-open No. Hei 7-268029 discloses a method of using as a carrier a Lewis acidic solid such as magnesium dichloride or aluminum trichloride. Further, Japanese Patent Application Laid-open No. Hei 8-176225 discloses a method of using as a carrier aluminum- and magnesium-containing solid component obtained by the reaction of a specific magnesium compound with aluminum compound.

However, the on-carrier-catalysts disclosed in those prior arts generally have made improvement in powder properties, fouling and the like, but catalyst activity, particularly polymerization activity per solid catalyst, has not yet been sufficient.

DISCLOSURE OF INVENTION

Accordingly, an object of the present invention is to provide a solid catalyst for olefin polymerization with which polymerization can be made with high activity while maintaining the characteristics of Kaminsky type catalyst, for example, that a polymer produced has narrow molecular weight distribution. Another object of the present invention is to provide a method for producing an olefinic polymer using the solid catalyst for olefin polymerization.

As a result of extensive investigations to achieve the above objects, the present inventors have found that a solid catalyst for olefin polymerization capable of achieving the above objects can be obtained by using as a carrier a magnesium-containing solid component obtained by heat treatment of a specific magnesium compound. The present invention has thus been completed based on this finding.

According to a first aspect of the present invention, there is provided a solid catalyst (D) for olefin polymerization, characterized by comprising a magnesium-containing solid component (A) carrying thereon an organoaluminum-oxy compound (B) and a metallocene compound (C), and the magnesium-containing compound (A) being obtained by heat treating a magnesium compound of the general formula:

$$MgX_2 \cdot nH_2O$$

where X represents a halogen atom and n is an integer of 1 to 12.

According to a second aspect of the present invention, there is provided a method for producing an olefinic polymer, characterized in that an olefin is polymerized or copolymerized in the presence of the above solid catalyst (D) for olefin polymerization and an organoaluminum compound (E).

A detailed description will now be given of a solid catalyst for olefin polymerization (hereinafter may be abbreviated as a "solid catalyst") according to the present invention and of the method for producing an olefinic polymer using the catalyst.

A magnesium-containing compound (A) for use in preparation of a solid catalyst (D) for olefin polymerization of the present invention is obtained by heat treating a magnesium compound of the general formula:

$$MgX_2 \cdot nH_2O$$

where X represents a halogen atom and n is an integer of 1 to 12. The compound represented by the general formula $MgX_2 \cdot nH_2O$ is a hydrate of magnesium dihalide, and a halogen atom X is chlorine, bromine or iodine. Examples of the compound include $MgCl_2 \cdot 2H_2O$, $MgCl_2 \cdot 4H_2O$, $MgCl_2 \cdot 6H_2O$, $MgCl_2 \cdot 8H_2O$, $MgCl_2 \cdot 12H_2O$, $MgBr_2 \cdot 6H_2O$, $MgBr_2 \cdot 8H_2O$, $MgBr_2 \cdot 10H_2O$, $MgI_2 \cdot 6H_2O$, $MgI_2 \cdot 8H_2O$ and, $MgI_2 \cdot 10H_2O$. Of those $MgCl_2 \cdot 2H_2O$, $MgCl_2 \cdot 4H_2O$, $MgCl_2 \cdot 6H_2O$ and $MgBr_2 \cdot 6H_2O$ are preferably used. Those compounds can be used alone or as mixtures of two or more thereof.

The heat treatment conditions of the magnesium compound are that the temperature is 100 to 500° C., preferably 150 to 300° C., and the heating time is 0.1 to 10 hours, preferably 0.5 to 4 hours. During the heat treatment, air or nitrogen gas is allowed to flow to remove by-products produced. A solid substance thus obtained generally has a composition that a gram atomic ratio of halogen to magnesium (halogen/magnesium) is 0.3 to 1.7, depending on the heating conditions. The solid substance is generally ground with a grinder such as a ball mill before the carrying process. In place of grinding the solid substance, the magnesium compound represented by the general formula $MgX_2 \cdot nH_2O$ may be used such that an aqueous solution of the magnesium compound is prepared and the aqueous solution is sprayed and dried to form spherical particles.

The organoaluminum-oxy compound (B) used in the preparation of the solid catalyst (D) for olefin polymerization of the present invention is selected from a linear aluminoxane of the following general formula (1) or a cyclic aluminoxane of the following general formula (2):

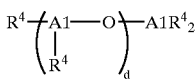
(1)

where $R^4$ each represents hydrogen atom, a halogen atom or an alkyl group having 1 to 10 carbon atoms, and d is an integer of 2 to 40, provided that when $R^4$ is a halogen atom all $R^4$ are not simultaneously halogen atoms;

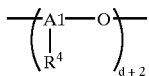
(2)

where $R^4$ and d are the same as defined in the above general formula (1).

In the case that $R^4$ in the general formulae (1) and (2) is an alkyl group having 1 to 10 carbon atoms, examples of the alkyl group include methyl group, ethyl group and isobutyl group. Further, in the case that $R^4$ in the general formulae (1) and (2) is a halogen atom, examples of the halogen atom include chlorine atom and bromine atom. $R^4$ groups in the compounds represented by the general formulae (1) and (2) may be different from one another. The number d of the repeating unit is selected from a range of 2 to 40 and is preferably selected from a range of 5 to 20. Of the compounds represented by the general formulae (1) and (2), those wherein all $R^4$ are methyl groups or at least one of $R^4$ is a methyl group are preferred.

Various known methods can be used to synthesize the organoaluminum-oxy compound (B) of the general formula (1) or (2). For example, the organoaluminum-oxy compound (B) can be prepared by the following methods: a method of dissolving trialkyl aluminum in a hydrocarbon solvent and gradually adding water to the resulting solution in an equivalent amount of trialkyl aluminum in the solvent to hydrolyze trialkyl aluminum; a method of suspending copper sulfate hydrate or aluminum sulfate hydrate in a hydrocarbon solvent and contacting trialkyl aluminum with the resulting suspension in an amount of 1 to 3 times equivalent of water of crystallization of the hydrate in the suspension to slowly hydrolyze trialkyl aluminum; or a method of contacting trialkyl aluminum with an undehydrated silica gel suspended in a hydrocarbon solvent in an amount of 1 to 3 times equivalent of adsorbed water in the silica gel to slowly hydrolyze trialkyl aluminum.

The metallocene compound (C) to be used in the present invention is a compound of the following general formula (3) or (4):

(3)

where M represents titanium, zirconium or hafnium, Cp represents a group having a cyclopentadienyl skeleton, $R^5$ and $R^6$ each represents hydrogen atom, an alkyl group, an alkenyl group, an aryl group, an alkylaryl group, an arylalkyl group or an alkylsilyl group, Y represents a halogen atom, hydrogen atom, a hydrocarbon group, silyl group, a halogenated hydrocarbon group, a nitrogen-containing organic group, an oxygen-containing organic group or a sulfur-containing organic group, e and f is each an integer of 0 to 5, and m and n is each an integer of 0 to 3, provided that m+n is an integer of 1 to 3;

(4)

where M represents titanium, zirconium or hafnium, Cp represents a group having a cyclopentadienyl skeleton, $R^5$ and $R^6$ each represents hydrogen atom, an alkyl group, an alkenyl group, an aryl group, an alkylaryl group, an arylalkyl group or an alkylsilyl group, R' represents a divalent group which links $(R^5{}_g Cp)$ and $(R^6{}_h CP)$, selected from an alkylene group, an arylalkylene group, a dialkylsilylene group, a dialkylgermylene group, an alkylphosphinediyl group, an alkylimino group or an alkylboranediyl group, Y represents a halogen atom, hydrogen atom, a hydrocarbon group, a silyl group, a halogenated hydrocarbon group, a nitrogen-containing organic group, an oxygen-containing organic group or a sulfur-containing organic group, g and h is each an integer of 0 to 4.

In the general formulae (3) and (4), Cp group as a ligand is not particularly limited so long as it is a group having a cyclopentadienyl skeleton, and includes, as well as a cyclopentadienyl group, a cyclopentadienyl group in which two adjacent carbon atoms of cyclopentadienyl ring are bonded to other carbon atoms to form 4-, 5- or 6-membered ring. Examples of the cyclopentadienyl group in which two adjacent carbon atoms of cyclopentadienyl ring are bonded to other carbon atoms to form 4-, 5- or 6-membered ring include indenyl group, tetrahydroindenyl group and fluorenyl group and so on.

In the general formulae (3) and (4), preferred examples of $R^5$ and $R^6$ when those are other than hydrogen atom include an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms and an alkylsilyl group having 3 to 20 carbon atoms.

In the general formula (3), the grouping $(R^5{}_e Cp)$ and $(R^6{}_f Cp)$ having the cyclopentadienyl skeleton may be for example, cyclopentadienyl, methylcyclopentadienyl, ethylcyclopentadienyl, n-propylcyclopentadienyl, isopropylcyclopentadienyl, n-butylcyclopentadienyl, isobutylcyclopentadienyl, tert-butylcyclopentadienyl, 1,2-dimethylcyclopentadienyl, 1,3-dimethylcyclopentadienyl, 1,2,4-trimethylcyclopentadienyl, 1,2,3-trimethylcyclopentadienyl, tetramethylcyclopentadienyl, pentamethylcyclopentadienyl, trimethylsilylcyclopentadienyl, trimethylsilyltetramethylcyclopentadienyl, (phenyldimethylsilyl)cyclopentadienyl, triphenylsilylcyclopentadienyl, 1,3-di(trimethylsilyl) cyclopentadienyl, cyclohexylcyclopentadienyl, allylcyclopentadienyl, benzylcyclopentadienyl, phenylcyclopentadienyl, tolylcyclopentadienyl, indenyl, 1-methylindenyl, 2-methylindenyl, 2,4-dimethylindenyl, 4,7-dimethoxyindenyl, 4,7-dichloroindenyl, 5,6-dimethylindenyl, 2-methyl-4-ethyl-indenyl, 2-methyl-4,6-diisopropyl-indenyl, naphthylindenyl, 4,5,6,7-tetrahydroindenyl, 2-methyl-tetrahydroindenyl, fluorenyl, 2,7-di-tert-butylfluorenyl, etc.

In the general formula (4), R' represents a divalent radical having 1 to 20 carbon atoms, which links $(R^5{}_g Cp)$ and $(R^6{}_h Cp)$. Concretely, it may be alkylene, such as methylene, ethylene; alkylidene, such as ethylidene, propylidene, isopropylidene; arylalkylidene, such as phenylmethylidene, diphenylmethylidene; silylene, such as dimethylsilylene, diethylsilylene, dipropylsilylene, diisopropylsilylene, methylethylsilylene, methylisopropylsilylene, methyltert-butylsilylene, methylphenylsilylene, diphenylsilylene; germylene, such as dimethylgermylene, diethylgermylene, dipropylgermylene, diisopropylgermylene, diphenylgermylene, methylethylgermylene, methylisopropylgermylene, methyltert-butylgermylene, methylphenylgermylene, diphenylgermylene;

alkylphosphinediyl, such as methylphosphinediyl; alkylimino, such as methylimino; alkylboranediyl, such as methylborandiyl or the like.

And, as the grouping R'(R$^5_g$Cp) (R$^6_h$Cp) having the cyclopentadienyl skeleton in the general formula (4), there are mentioned, for example, ethylenebisindenyl, diphenylmethylenebisindenyl, dimethylsilylenebisindenyl, isopropylidenebisindenyl, dimethylsilylenebistetrahydroindenyl, isopropylidenecyclopentadienyl-1-fluorenyl, diphenylmethylencyclopentadienyl-1-fluorenyl, dimethylsilylenecyclopentadienyl-1-fluorenyl, dimethylsilylenebis(2,3,5-trimethylcyclopentadienyl), dimethylsilylenebis(2,4-dimethylcyclopentadienyl), dimethylsilylenebis(3-methylcyclopentadienyl), isopropylidenecyclopentadienyl-methylcyclopentadienyl, isopropylidenecyclopentadienyl-2,3,5-trimethylcyclopentadienyl, diphenylmethylenecyclopentadienyl-methylcyclopentadienyl, diphenylmethylenecyclopentadienyl-2,4-dimethylcyclopentadienyl, diphenylmethylenecyclopentadienyl-2,3,5-trimethylcyclopentadienyl, dimethylsilylencyclopentadienyl-methylcyclopentadienyl, dimethylsilylenecyclopentadienyl-2,4-dimethylcyclopentadienyl, dimethylsilylenecyclopentadienyl-2,3,5-trimethylcyclopentadienyl, isopropylidene-2,4-dimethylcyclopentadienyl-1-fluorenyl, diphenylmethylene-2,4-dimethylcyclopentadienyl-1-fluorenyl, dimethylsilylene-2,4-dimethylcyclopentadienyl-1-fluorenyl, cyclohexylidenecyclopentadienyl-1-fluorenyl, dimethylgermylenebis-1-indenyl, etc.

The metallocene compounds according to the definition of the general formula (3) mentioned above may be exemplified by the following compounds in which the radical Y is one of various phenoxy or substituted phenoxy groups:

dicyclopentadienylbis(2-fluorophenoxy)zirconium,
dicyclopentadienylbis(3-fluorophenoxy)zirconium,
dicyclopentadienylbis(4-fluorophenoxy)zirconium,
dicyclopentadienylbis(2-chlorophenoxy)zirconium,
dicyclopentadienylbis(3-chlorophenoxy)zirconium,
dicyclopentadienylbis(4-chlorophenoxy)zirconium,
dicyclopentadienylbis(2-bromophenoxy)zirconium,
dicyclopentadienylbis(3-bromophenoxy)zirconium,
dicyclopentadienylbis(4-bromophenoxy)zirconium,
dicyclopentadienylbis(2-iodophenoxy)zirconium,
dicyclopentadienylbis(3-iodophenoxy)zirconium,
dicyclopentadienylbis(4-iodophenoxy)zirconium,
dicyclopentadienylbis(2,3-difluorophenoxy)zirconium,
dicyclopentadienylbis(2,4-difluorophenoxy)zirconium,
dicyclopentadienylbis(2,5-difluorophenoxy)zirconium,
dicyclopentadienylbis(2,6-difluorophenoxy)zirconium,
dicyclopentadienylbis(3,4-difluorophenoxy)zirconium,
dicyclopentadienylbis(3,5-difluorophenoxy)zirconium,
dicyclopentadienylbis(2,3-dichlorophenoxy)zirconium,
dicyclopentadienylbis(2,4-dichlorophenoxy)zirconium,
dicyclopentadienylbis(2,5-dichlorophenoxy)zirconium,
dicyclopentadienylbis(2,6-dichlorophenoxy)zirconium,
dicyclopentadienylbis(3,4-dichlorophenoxy)zirconium,
dicyclopentadienylbis(3,5-dichlorophenoxy)zirconium,
dicyclopentadienylbis(2,3,4-trifluorophenoxy)zirconium,
dicyclopentadienylbis(2,3,5-trifluorophenoxy)zirconium,
dicyclopentadienylbis(2,3,6-trifluorophenoxy)zirconium,
dicyclopentadienylbis(2,4,5-trifluorophenoxy)zirconium,
dicyclopentadienylbis(2,4,6-trifluorophenoxy)zirconium,
dicyclopentadienylbis(3,4,5-trifluorophenoxy)zirconium,
dicyclopentadienylbis(2,3,5,6-tetrafluorophenoxy)zirconium,
dicyclopentadienylbis(pentafluorophenoxy)zirconium,
dicyclopentadienylbis(2-fluoromethylphenoxy)zirconium,
dicyclopentadienylbis(3-fluoromethylphenoxy)zirconium,
dicyclopentadienylbis(4-fluoromethylphenoxy)zirconium,
dicyclopentadienylbis(2-chloromethylphenoxy)zirconium,
dicyclopentadienylbis(3-chloromethylphenoxy)zirconium,
dicyclopentadienylbis(4-chloromethylphenoxy)zirconium,
dicyclopentadienylbis(2-trifluoromethylphenoxy)zirconium,
dicyclopentadienylbis(3-trifluoromethylphenoxy)zirconium,
dicyclopentadienylbis(4-trifluoromethylphenoxy)zirconium,
dicyclopentadienylbis(3,5-di-(trifluoromethyl)phenoxy)zirconium,
dicyclopentadienylbis(2-(2,2,2-trifluoroethyl)phenoxy)zirconium,
dicyclopentadienylbis(3-(2,2,2-trifluoroethyl)phenoxy)zirconium,
dicyclopentadienylbis(4-(2,2,2-trifluoroethyl)phenoxy)zirconium,
dicyclopentadienylbis(2-trichloromethylphenoxy)zirconium,
dicyclopentadienylbis(3-trichloromethylphenoxy)zirconium,
dicyclopentadienylbis(4-trichloromethylphenoxy)zirconium,
dicyclopentadienylbis(2-methylphenoxy)zirconium,
dicyclopentadienylbis(3-methylphenoxy)zirconium,
dicyclopentadienylbis(4-methylphenoxy)zirconium,
dicyclopentadienylbis(2,3-dimethylphenoxy)zirconium,
dicyclopentadienylbis(2,4-dimethylphenoxy)zirconium,
dicyclopentadienylbis(2,5-dimethylphenoxy)zirconium,
dicyclopentadienylbis(2,6-dimethylphenoxy)zirconium,
dicyclopentadienylbis(3,4-dimethylphenoxy)zirconium,
dicyclopentadienylbis(3,5-dimethylphenoxy)zirconium,
dicyclopentadienylbis(2,3,4-trimethylphenoxy)zirconium,
dicyclopentadienylbis(2,3,5-trimethylphenoxy)zirconium,
dicyclopentadienylbis(2,3,6-trimethylphenoxy)zirconium,
dicyclopentadienylbis(2,4,5-trimethylphenoxy)zirconium,
dicyclopentadienylbis(2,4,6-trimethylphenoxy)zirconium,
dicyclopentadienylbis(3,4,5-trimethylphenoxy)zirconium, dicyclopentadienylbis(pentamethylphenoxy)zirconium,
dicyclopentadienylbis(2-methyl-4-fluorophenoxy)zirconium,
dicyclopentadienylbis(2-chloro-4-fluorophenoxy)zirconium,
dicyclopentadienylbis(2-chloro-4-trifluoromethylphenoxy)zirconium,
dicyclopentadienylbis(2-fluoro-4-trifluoromethylphenoxy)zirconium,
dicyclopentadienylbis(2-trifluoromethyl-4-florophenoxy)zirconium,
dicyclopentadienylbis(2-ethylphenoxy)zirconium,
dicyclopentadienylbis(3-ethylphenoxy)zirconium,
dicyclopentadienylbis(4-ethylphenoxy)zirconium,
dicyclopentadienylbis(2-isopropylphenoxy)zirconium,
dicyclopentadienylbis(3-isopropylphenoxy)zirconium,
dicyclopentadienylbis(4-isopropylphenoxy)zirconium,
dicyclopentadienylbis(2-tert-butylphenoxy)zirconium,
dicyclopentadienylbis(3-tert-butylphenoxy)zirconium,
dicyclopentadienylbis(4-tert-butylphenoxy)zirconium,
dicyclopentadienylbis(3,5-di-tert-butylphenoxy)zirconium,
dicyclopentadienylbis(2,8-dimethyl-1-naphthyloxy)zirconium,
dicyclopentadienylbis(1-tert-butyl-2-naphthyloxy)zirconium,
dicyclopentadienylbis(8-bromo-2-naphthyloxy)zirconium,
dicyclopentadienylbis(2-phenylphenoxy)zirconium,
dicyclopentadienylbis(3-phenylphenoxy)zirconium,
dicyclopentadienylbis(4-phenylphenoxy)zirconium,
dicyclopentadienylbis(2-benzylphenoxy)zirconium,
dicyclopentadienylbis(2-methoxycarbonylphenoxy)zirconium,
dicyclopentadienylbis(2-acetoxyphenoxy)zirconium,
dicyclopentadienylbis(2-cyanophenoxy)zirconium,
dicyclopentadienylbis(2-nitrophenoxy)zirconium,
dicyclopentadienylbis(2-dimethylaminophenoxy)zirconium,
dicyclopentadienylbis(2-trifluoromethanesulfonylphenoxy)zirconium,
dicyclopentadienylbis(4-fluorothiophenoxy)zirconium,
dicyclopentadienylbis(2-trifluoromethylthiophenoxy)zirconium,
dicyclopentadienylbis(3-trifluoromethylthiophenoxy)zirconium,
bis(methylcyclopentadienyl)bis(2-chlorophenoxy)zirconium,
bis(methylcyclopentadienyl)bis(2-trifluoromethylphenoxy)zirconium,
bis(1,2-dimethylcyclopentadienyl)bis(2-ethylphenoxy)zirconium,
bis(1,3-dimethylcyclopentadienyl)bis(2-trifluoromethylphenoxy)zirconium,
bis(1,3-dimethylcyclopentadienyl)bis(3-tert-butylphenoxy)zirconium,
bis(1,2,3-trimethylcyclopentadienyl)bis(2-fluorophenoxy)zirconium,
bis(1,2,3-trimethylcyclopentadienyl)bis(3-fluorophenoxy)zirconium,
bis(1,2,3-trimethylcyclopentadienyl)bis(4-fluorophenoxy)zirconium,
bis(1,2,3-trimethylcyclopentadienyl)bis(2-isopropylphenoxy)zirconium,
bis(1,2,4-trimethylcyclopentadienyl)bis(2-trifluoromethylphenoxy)zirconium,
bis(1,2,4-trimethylcyclopentadienyl)bis(2-methylphenoxy)zirconium,
bis(1,2,4-trimethylcyclopentadienyl)bis(4-methylphenoxy)zirconium,
bis(1,2,4-trimethylcyclopentadienyl)bis(2,4-dimethylphenoxy)zirconium,
bis(1,2,4-trimethylcyclopentadienyl)bis(2,4-dichlorophenoxy)zirconium,
bis(1,2,4-trimethylcyclopentadienyl)bis(2-tert-butylphenoxy)zirconium,
bis(1,2,4-trimethylcyclopentadienyl)bis(3-tert-butylphenoxy)zirconium,
bis(1,2,4-trimethylcyclopentadienyl)bis(4-tert-butylphenoxy)zirconium,
bis(1,2,3,4-tetramethylcyclopentadienyl)bis(2-methoxyphenoxy)zirconium,
bis(1,2,3,4-tetramethylcyclopentadienyl)bis(3-methoxyphenoxy)zirconium,
bis(1,2,3,4-tetramethylcyclopentadienyl)bis(4-methoxyphenoxy)zirconium,
bis(1,2,3,4-tetramethylcyclopentadienyl)bis(2-iodophenoxy)zirconium,
bis(1,2,3,4-tetramethylcyclopentadienyl)bis(3-iodophenoxy)zirconium,
bis(1,2,3,4-tetramethylcyclopentadienyl)bis(4-iodophenoxy)zirconium,
bis(1,2,3,4-tetramethylcyclopentadienyl)bis(2-thiomethylphenoxy)zirconium,
bis(1,2,3,4-tetramethylcyclopentadienyl)bis(3-thiomethyiphenoxy)zirconium,
bis(1,2,3,4-tetramethylcyclopentadienyl)bis(4-thiomethylphenoxy)zirconium,
bis(pentamethylcyclopentadienyl)bis(2-fluorophenoxy)zirconium,
bis(pentamethylcyclopentadienyl)bis(3-fluorophenoxy)zirconium,
bis(pentamethylcyclopentadienyl)bis(4-fluorophenoxy)zirconium,
bis(ethylcyclopentadienyl)bis(2-ethylphenoxy)zirconium,
bis(ethylcyclopentadienyl)bis(3-ethylphenoxy)zirconium,
bis(ethylcyclopentadienyl)bis(4-ethylphenoxy)zirconium,
bis(isopropylcyclopentadienyl)bis(2-acetylphenoxy)zirconium,
bis(isopropylcyclopentadienyl)bis(3-acetylphenoxy)zirconium,
bis(isopropylcyclopentadienyl)bis(4-acetylphenoxy)zirconium,
bis(isopropylcyclopentadienyl)bis(2-methylphenoxy)zirconium,
bis(isopropylcyclopentadienyl)bis(3-methylphenoxy)zirconium,
bis(isopropylcyclopentadienyl)bis(4-methylphenoxy)zirconium, bis(n-butylcyclopentadienyl)bis(2-chlorophenoxy) zirconium,
bis(n-butylcyclopentadienyl)bis(3-chlorophenoxy) zirconium,
bis(n-butylcyclopentadienyl)bis(4-chlorophenoxy) zirconium,
bis(n-butylcyclopentadienyl)bis(2-trifluoromethylphenoxy)zirconium,
bis(n-butylcyclopentadienyl)bis(3-trifluoromethylphenoxy)zirconium,
bis(n-butylcyclopentadienyl)bis(4-trifluoromethylphenoxy)zirconium,
bis(n-butylcyclopentadienyl)bis(2-tert-butylphenoxy) zirconium,
bis(n-butylcyclopentadienyl)bis(3-tert-butylphenoxy) zirconium,
bis(n-butylcyclopentadienyl)bis(4-tert-butylphenoxy) zirconium,
bis(n-butylcyclopentadienyl)bis(2-cyanophenoxy) zirconium,
bis(n-butylcyclopentadienyl)bis(3-cyanophenoxy) zirconium,
bis(n-butylcyclopentadienyl)bis(4-cyanophenoxy) zirconium,
bis(tert-butylcyclopentadienyl)bis(2-fluorophenoxy) zirconium,
bis(tert-butylcyclopentadienyl)bis(3-fluorophenoxy) zirconium,
bis(tert-butylcyclopentadienyl)bis(4-fluorophenoxy) zirconium,
bis(tert-butylcyclopentadienyl)bis(2-ethylphenoxy) zirconium,
bis(tert-butylcyclopentadienyl)bis(3-ethylphenoxy) zirconium,
bis(tert-butylcyclopentadienyl)bis(4-ethylphenoxy) zirconium,
bis(tert-butylcyclopentadienyl)bis(2,4-dimethylphenoxy) zirconium,
bis(1,3-di-tert-butylcyclopentadienyl)bis(2-chlorophenoxy)zirconium,
bis(1,3-di-tert-butylcyclopentadienyl)bis(3-chlorophenoxy)zirconium,
bis(1,3-di-tert-butylcyclopentadienyl)bis(4-chlorophenoxy)zirconium,
bis(1,3-di-tert-butylcyclopentadienyl)bis(2-trifluoromethylphenoxy)zirconium,
bis(1,3-di-tert-butylcyclopentadienyl)bis(3-trifluoromethylphenoxy)zirconium,
bis(1,3-di-tert-butylcyclopentadienyl)bis(4-trifluoromethylphenoxy)zirconium,
bis(phenylcyclopentadienyl)bis(2-phenylphenoxy) zirconium,
bis(phenylcyclopentadienyl)bis(3-phenylphenoxy) zirconium,
bis(phenylcyclopentadienyl)bis(4-phenylphenoxy) zirconium,
bis(phenylcyclopentadienyl)bis(2,4-dichlorophenoxy) zirconium,
bis(trimethylsilylcyclopentadienyl)bis(2-tert-butoxyphenoxy)zirconium,
bis(trimethylsilylcyclopentadienyl)bis(3-tert-butoxyphenoxy)zirconium,
bis(trimethylsilylcyclopentadienyl)bis(4-tert-butoxyphenoxy)zirconium,
bis(trimethylsilylcyclopentadienyl)bis(2-phenylphenoxy) zirconium,
bis(trimethylsilylcyclopentadienyl)bis(3-phenylphenoxy) zirconium,
bis(trimethylsilylcyclopentadienyl)bis(4-phenylphenoxy) zirconium,
bis(trimethylsilylcyclopentadienyl)bis(2,4-difluorophenoxy)zirconium,
bis(cyclohexylcyclopentadienyl)bis(2-iodophenoxy) zirconium,
bis(cyclohexylcyclopentadienyl)bis(3-iodophenoxy) zirconium,
bis(cyclohexlycyclopentadienyl)bis(4-iodophenoxy) zirconium,
bis(indenyl)bis(2-methylphenoxy)zirconium,
bis(indenyl)bis(3-methylphenoxy)zirconium,
bis(indenyl)bis(4-methylphenoxy)zirconium,
bis(1-methylindenyl)bis(2-fluorophenoxy)zirconium,
bis(1-methylindenyl)bis(3-fluorophenoxy)zirconium,
bis(1-methylindenyl)bis(4-fluorophenoxy)zirconium,
bis(2-methylindenyl)bis(4-fluorophenoxy)zirconium,
bis(2-methylindenyl)bis(2-bromophenoxy)zirconium,
bis(2-methylindenyl)bis(3-bromophenoxy)zirconium,
bis(2-methylindenyl)bis(4-bromophenoxy)zirconium,
bis(5,6-dimethylindenyl)bis(2-isopropylphenoxy) zirconium,
bis(5,6-dimethylindenyl)bis(3-isopropylphenoxy) zirconium,
bis(5,6-dimethylindenyl)bis(4-isopropylphenoxy) zirconium,
bis(5,6-dimethoxyindenyl)bis(2-cyanophenoxy) zirconium,
bis(5,6-dimethoxyindenyl)bis(3-cyanophenoxy) zirconium,
bis(5,6-dimethoxyindenyl)bis(4-cyanophenoxy) zirconium,
bis(fluorenyl)bis(2-chlorophenoxy)zirconium,
bis(fluorenyl)bis(3-chlorophenoxy)zirconium,
bis(fluorenyl)bis(4-chlorophenoxy)zirconium,
bis(4,5,6,7-tetrahydroindenyl)bis(2-tert-butylphenoxy) zirconium,
bis(4,5,6,7-tetrahydroindenyl)bis(3-tert-butyphenoxy) zirconium,
bis(4,5,6,7-tetrahydroindenyl)bis(4-tert-butylphenoxy) zirconium,
bis(2-methyltetrahydroindenyl)bis(2-nitrophenoxy) zirconium,
bis(2-methyltetrahydroindenyl)bis(3-nitrophenoxy) zirconium,
bis(2-methyltetrahydroindenyl)bis(4-nitrophenoxy) zirconium,
bis(2,7-di-tert-butylfluorenyl)bis(2-trifluoromethylphenoxy)zirconium,
bis(2,7-di-tert-butylfluorenyl)bis(3-trifluoromethylphenoxy)zirconium,
bis(2,7-di-tert-butylfluorenyl)bis(4-trifluoromethylphenoxy)zirconium, etc.

In the present invention, in addition to the compound of the general formula (3) as mentioned above, the metallocene compounds of the general formula (3) may also be used, in which the radical Y is a chlorine atom, a bromine atom, a hydrogen atom, methyl, ethyl, phenyl and the like.

Such metallocene compounds may be, for example, bis(cyclopentadienyl)zirconium monochloride monohydride,
bis(cyclopentadienyl)zirconium monobromide monohydride,
bis(cyclopentadienyl)methyl zirconium hydride,
bis(cyclopentadienyl)ethyl zirconium hydride,
bis(cyclopentadienyl)phenyl zirconium hydride,
bis(cyclopentadienyl)benzyl zirconium hydride,
bis(cyclopentadienyl)neopentyl zirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methyl zirconium monochloride,
bis(cyclopentadienyl)ethyl zirconium monochloride,
bis(cyclopentadienyl)cyclohexyl zirconium monochloride,
bis(cyclopentadienyl)phenyl zirconium monochloride,
bis(cyclopentadienyl)benzyl zirconium monochloride,
bis(methylcyclopentadienyl)zirconium dichloride,
bis(dimethylcyclopentadienyl)zirconium dichloride,
bis(trimethylcyclopentadienyl)zirconium dichloride,
bis(butylcyclopentadienyl)zirconium dichloride,
bis(cyclopentadienyl)zirconium dimethyl,
bis(cyclopentadienyl)zirconium diphenyl,
bis(cyclopentadienyl)zirconium dibenzyl,
bis(indenyl)zirconium dichloride,
bis(indenyl)zirconium dibromide,
bis(fluorenyl)zirconium dichloride, etc.

Further, in addition to the various metallocene compounds as mentioned above, the metallocene compounds of general formula (3) in which zirconium atom as M is replaced by titanium atom or hafnium atom may be used likewise.

On the other hand, the metallocene compounds of the general formula (4), the following compounds, in which the radical Y is one of various phenoxy groups, may be exemplified by:

ethylenebis(indenyl)bis(4-trifluoromethylphenoxy)zirconium,
ethylenebis(indenyl)bis(4-fluorophenoxy)zirconium,
ethylenebis(indenyl)bis(4-chlorophenoxy)zirconium,
ethylenebis(indenyl)bis(2-fluorophenoxy)zirconium,
ethylenebis(3-methylindenyl)bis(4-trifluoromethylphenoxy)zirconium,
ethylenebis(3-methylindenyl)bis(4-fluorophenoxy)zirconium,
ethylenebis(3-methylindenyl)bis(4-chlorophenoxy)zirconium,
ethylenebis(3-methylindenyl)bis(2-fluorophenoxy)zirconium,
ethylenebis(5,6-dimethylindenyl)bis(4-trifluoromethylphenoxy)zirconium,
ethylenebis(5,6-dimethylindenyl)bis(4-fluorophenoxy)zirconium,
ethylenebis(5,6-dimethylindenyl)bis(4-chlorophenoxy)zirconium,
ethylenebis(5,6-dimethylindenyl)bis(2-fluorophenoxy)zirconium,
ethylenebis(4,7-dimethylindenyl)bis(4-trifluoromethylphenoxy)zirconium,
ethylenebis(4,7-dimethylindenyl)bis(4-fluorophenoxy)zirconium,
ethylenebis(5,6-dimethoxyindenyl)bis(4-trifluoromethylphenoxy)zirconium,
ethylenebis(5,6-dimethoxyindenyl)bis(4-fluorophenoxy)zirconium,
ethylenebis(5,6-dihydroindenyl)bis(4-trifluoromethylphenoxy)zirconium,
ethylenebis(5,6-dihydroindenyl)bis(4-fluorophenoxy)zirconium,
ethylenebis(5,6-dihydroindenyl)bis(4-chlorophenoxy)zirconium,
ethylenebis(5,6-dihydroindenyl)bis(2-fluorophenoxy)zirconium,
ethylenebis(4,5,6,7-tetrahydroindenyl)bis(4-trifluoromethylphenoxy)zirconium,
ethylenebis(4,5,6,7-tetrahydroindenyl)bis(4-fluorophenoxy)zirconium,
ethylenebis(4,5,6,7-tetrahydroindenyl)bis(4-chlorophenoxy)zirconium,
ethylenebis(4,5,6,7-tetrahydroindenyl)bis(2-fluorophenoxy)zirconium,
methylenebis(cyclopentadienyl)bis(2-fluorophenoxy)zirconium,
methylenebis(cyclopentadienyl)bis(2-ethylphenoxy)zirconium,
methylenebis(methylcyclopentadienyl)bis(3-chlorophenoxy)zirconium,
methylenebis(1,3-dimethylcyclopentadienyl)bis(2-trifluoromethylphenoxy)zirconium,
methylenebis(n-butylcyclopentadienyl)bis(4-tert-butylphenoxy)zirconium,
ethylenebis(3-methylcyclopentadienyl)bis(4-trifluoromethylphenoxy)zirconium,
ethylenebis(3-methylcyclopentadienyl)bis(4-fluorophenoxy)zirconium,
ethylenebis(3-isopropylcyclopentadienyl)bis(4-trifluoromethylphenoxy)zirconium,
ethylenebis(3-isopropylcyclopentadienyl)bis(4-fluorophenoxy)zirconium,
ethylenebis(3-tert-butylcyclopentadienyl)bis(4-trifluoromethylphenoxy)zirconium,
ethylenebis(3-tert-butylcyclopentadienyl)bis(4-fluorophenoxy)zirconium,
isopropylidene(cyclopentadienyl)(indenyl)bis(4-trifluoromethylphenoxy)zirconium,
isopropylidene(cyclopentadienyl)(indenyl)bis(4-fluorophenoxy)zirconium,
isopropylidene(methylcyclopentadienyl)(indenyl)bis(4-trifluoromethylphenoxy)zirconium,
isopropylidene(methylcyclopentadienyl)(indenyl)bis(4-fluorophenoxy)zirconium,
isopropylidenebis(indenyl)bis(4-trifluoromethylphenoxy)zirconium,
isopropylidenebis(indenyl)bis(4-fluorophenoxy)zirconium,
isopropylidene(cyclopentadienyl)(fluorenyl)bis(4-trifluoromethylphenoxy)zirconium, isopropylidene(cyclopentadienyl)(fluorenyl)bis(4-fluorophenoxy)zirconium,
isopropylidene(3-methylcyclopentadienyl)(fluorenyl)bis(4-trifluoromethylphenoxy)zirconium,
isopropylidene(3-methylcyclopentadienyl)(fluorenyl)bis(4-fluorophenoxy)zirconium,
tetramethylethylidenebis(2-tert-butylcyclopentadienyl)bis(4-trifluoromethylphenoxy)zirconium,
tetramethylethylidenebis(2-tert-butylcyclopentadienyl)bis(4-fluorophenoxy)zirconium,
dimethylsilylenebis(indenyl)bis(4-trifluoromethylphenoxy)zirconium,
dimethylsilylenebis(indenyl)bis(4-fluorophenoxy)zirconium,
dimethylsilylenebis(2-methylindenyl)bis(4-trifluoromethylphenoxy)zirconium,
dimethylsilylenebis(2-methylindenyl)bis(4-fluorophenoxy)zirconium,
dimethylsilylenebis(2-ethylindenyl)bis(4-trifluoromethylphenoxy)zirconium,
dimethylsilylenebis(2-ethylindenyl)bis(4-fluorophenoxy)zirconium,
dimethylsilylenebis(2-methyl-5-isopropylindenyl)bis(4-trifluoromethylphenoxy)zirconium,
dimethylsilylenebis(2-methyl-5-isopropylindenyl)bis(4-fluorophenoxy)zirconium,
dimethylsilylenebis(4,5,6,7-tetrahydroindenyl)bis(4-trifluoromethylphenoxy)zirconium,
dimethylsilylenebis(4,5,6,7-tetrahydroindenyl)bis(4-fluorophenoxy)zirconium,
dimethylsilylenebis(2-tert-butylcyclopentadienyl)bis(4-trifluoromethylphenoxy)zirconium,
dimethylsilylenebis(2-tert-butylcyclopentadienyl)bis(4-fluorophenoxy)zirconium,
dimethylsilylenebis(2-tert-butyl-4-methylcyclopentadienyl)bis(4-fluorophenoxy)zirconium,
dimethylsilylenebis(2-isopropyl-4-methylcyclopentadienyl)bis(4-fluorophenoxy)zirconium,
dimethylsilylene(2,3,5-trimethylcyclopentadienyl)(2,4,5-trimethylcyclopentadienyl)bis(4-fluorophenoxy)zirconium,
dimethylsilylene(2,4-dimethylcyclopentadienyl)(3,5-dimethylcyclopentadienyl)bis(4-fluorophenoxy)zirconium,
dimethylsilylene(3-tert-butylcyclopentadienyl)(4-tert-butylcyclopentadienyl)bis(4-fluorophenoxy)zirconium,
dimethylsilylene(3-methylcyclopentadienyl)(4-methylcyclopentadienyl)bis(4-fluorophenoxy)zirconium,
dimethylsilylene(2,4-dimethylcyclopentadienyl)(3-methylcyclopentadienyl)bis(4-fluorophenoxy)zirconium,
dimethylsilylene(2,4-dimethylcyclopentadienyl)(4-methylcyclopentadienyl)bis(4-fluorophenoxy)zirconium,
dimethylsilylene(3,4-dimethylcyclopentadienyl)(3-methylcyclopentadienyl)bis(4-fluorophenoxy)zirconium,
dimethylsilylene(3-tert-butylcyclopentadienyl)(3-methylcyclopentadienyl)bis(4-fluorophenoxy)zirconium,
dimethylsilylene(3-tert-butylcyclopentadienyl)(4-methylcyclopentadienyl)bis(4-fluorophenoxy)zirconium,
dimethylsilylene(2,3,5-trimethylcyclopentadienyl)(cyclopentadienyl)bis(4-fluorophenoxy)zirconium,
dimethylsilylene(2,4-dimethylcyclopentadienyl)(cyclopentadienyl)bis(4-fluorophenoxy)zirconium,
dimethylsilylene(3-tert-butylcyclopentadienyl)(cyclopentadienyl)bis(4-fluorophenoxy)zirconium,
dimethylsilylene(3-methylcyclopentadienyl)(cyclopentadienyl)bis(4-fluorophenoxy)zirconium,
dimethylsilylene(cyclopentadienyl)(indenyl)bis(4-trifluoromethylphenoxy)zirconium,
dimethylsilylene(cyclopentadienyl)(indenyl)bis(4-fluorophenoxy)zirconium,
diphenylsilylene(indenyl)bis(4-trifluoromethylphenoxy)zirconium,
diphenylsilylenebis(indenyl)bis(4-fluorophenoxy)zirconium,
dibenzylsilylenebis(indenyl)bis(4-trifluoromethylphenoxy)zirconium,
dibenzylsilylenebis(indenyl)bis(4-fluorophenoxy)zirconium,
methylphenylsilylenebis(2-methylindenyl)bis(4-trifluoromethylphenoxy)zirconium,
methylphenylsilylenebis(2-methylindenyl)bis(4-fluorophenoxy)zirconium,
dimethylsilylenebis(3,4-dimethylcyclopentadienyl)bis(4-trifluoromethylphenoxy)zirconium,
dimethylsilylenebis(3,4-dimethylcyclopentadienyl)bis(4-fluorophenoxy)zirconium,
dimethylsilylenebis(4,5,6,7-tetrahydroindenyl)bis(4-trifluoromethylphenoxy)zirconium,
dimethylsilylenebis(4,5,6,7-tetrahydroindenyl)bis(4-fluorophenoxy)zirconium, etc.

Furthermore, in the present invention, the metallocene compounds of the general formula (4) having a chlorine atom, a bromine atom, a hydrogen atom, methyl, ethyl, benzyl, phenyl and the like as radical Y may be used in addition to the aforementioned metallocene compounds of formula (4). They may be exemplified by ethylenebis(indenyl)dimethyl zirconium,
etheylenebis(indenyl)diethyl zirconium,
ethylenebis(indenyl)diphenyl zirconium,
etheylenebis(indenyl)methyl zirconium monochloride,
ethylenebis(indenyl)ethyl zirconium monochloride,
etheylenebis(indenyl)methyl zirconium monobromide,
ethylenebis(indenyl)zirconium dichloride,
ethylenebis(indenyl)zirconium dibromide,
dimetheylsilylenebis(cyclopentadienyl)zirconium dichloride,
dimetheylsilylenebis(indenyl)zirconium dichloride,
dimethylsilylenebis(methylcyclopentadienyl)zirconium dichloride,
dimethylsilylenebis(dimethylcyclopentadienyl)zirconium dichloride,
dimethylsilylenebis(trimethylcyclopentadienyl)zirconium dichloride,
isopropylidenebis(indenyl)zirconium dichloride,
isopropylidene(cyclopentadienyl)(fluorenyl)zirconium dichloride, etc.

Other than the various metallocene compounds listed above, compounds in which M in the general formula (4) is substituted from zirconium atom to titanium atom or hafnium atom can also be used.

The solid catalyst (D) for olefin polymerization used in the present invention is prepared by contacting three components, namely, a magnesium-containing solid component (A), a organoaluminum-oxy compound (B) and a metallocene compound (C), one another. The method of contacting those three components is not particularly limited. A method of simultaneously contacting three components or a method of previously contacting two components out of the three components and then contacting the remaining one component may be used. Of various contacting methods, the preferred is a method in which the magnesium-containing solid component (A) is contacted with organoaluminum-oxy compound (B) and then with the metallocene compound (C) or a method in which the organoaluminum-oxy compound (B) is previously contacted with the metallocene compound (C) and then the thus-obtained product is contacted with the magnesium-containing solid component (A).

In the above method, it is preferable to use a method of contacting in an aromatic hydrocarbon-based inert solvent such as benzene, toluene, xylene or chlorobenzene, or an aliphatic hydrocarbon-based inert solvent such as hexane, heptane, cyclohexane, methylcyclohexane or the like.

After contacting three components, the solid catalyst (D) produced is normally washed with the above-described inert solvent to use.

In contacting the magnesium-containing solid component (A) with the organoaluminum-oxy compound (B) and the metallocene compound (C), the amount of the organoaluminum-oxy compound (B) used is 1 to 100 mmol, preferably 5 to 50 mmol as the amount of Al, per 1 g of the magnesium-containing solid component (A). The metallocene compound (C) is used generally in an amount of $1 \times 10^{-5}$ to $5 \times 10^{-3}$ mol, preferably $5 \times 10^{-5}$ to $1 \times 10^{-3}$ mol, per 1 g of the magnesium-containing compound (A).

The solid catalyst (D) in the present invention can be used alone in the polymerization of an olefin, but is preferably used in combination with an organoaluminum compound (E) as a co-catalyst.

The organoaluminum compound (E) for use in polymerization is not particularly limited, and trialkyl aluminum, organoaluminum-oxy compound or the like is used. Examples of the trialkyl aluminum include trimethyl aluminum, triethyl aluminum, triisobutyl aluminum, trihexyl aluminum, trioctyl aluminum and the like. Examples of the organoaluminum-oxy compound include methyl aluminoxane, ethyl aluminoxane, isobutyl aluminoxane and so on. The number of aluminoxane unit is 2 to 40 in those compounds and the compounds may have either a linear structure or a cyclic structure. Further, mixtures of those compounds enumerated may also be used as the organoaluminum compound (E).

In the case of using the solid catalyst (D) together with a co-catalyst, they may be added to the inert hydrocarbon solvent or the olefin medium that is used for polymerization. The solid catalyst (D) and the co-catalyst may be used after mixing them for a given period of time to contact them with each other prior to polymerization, or may be used by separately adding those to the polymerization reaction system. In that case, the order of the addition of these components may optionally be chosen.

The solid catalyst (D) of the present invention may be used in a treatment of a so-called pre-polymerization in which a relatively small amount of an olefin is preliminarily polymerized prior to polymerization of the olefin. In such pre-polymerization, the olefin is polymerized so as to form an olefin polymer in an amount of 0.05 to 500 g, preferably 0.1 to 100 g, per 1 gram of the on-carrier-catalyst.

The solid catalyst (D) for olefin polymerization of the present invention is suitable for use in homopolymerization of ethylene or propylene or copolymerization of ethylene or propylene with 10 mol % or less of α-olefin having 3 to 20 carbon atoms, linear diolefin, cyclic olefin, cyclic polyene or aromatic vinyl compound.

Examples of the α-olefin include propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, 1-icosene and the like.

The linear diolefin is preferably a linear diolefin having 4 to 20 carbon atoms, and examples thereof include non-conjugated dienes such as 1,4-pentadiene, 1,4-hexadiene, 1,5-hexadiene, 4-methyl-1,4-hexadiene, 5-methyl-1,4-hexadiene, 5-methyl-1,5-heptadiene, 1,7-octadiene, 7-methyl-1,6-octadiene or 1,9-decadiene, and conjugated dienes such as butadiene, isoprene, chloroprene, 1,3-pentadiene or 1,3-hexadiene, etc.

The cyclic olefin is preferably a cyclic olefin having 4 to 40 carbon atoms, and examples thereof include cyclobutene, cyclopentene, cyclohexene, cycloheptene, cyclooctene, 2-norbornene, 5-methyl-2-norbornene, 5-ethyl-2-norbornene, 5-chloro-2-norbornene, 5-methoxy-2-norbornene, 5,6-dicarboxylnorbornene anhydrate, tetracyclododecene, 5-phenylnorbornene and so on.

The cyclic polyene is preferably a cyclic polyene having 5 to 40 carbon atoms, and examples thereof include dicyclopentadiene, cyclopentadiene, norbornadiene, 5-vinyl-2-norbornene, 5-ethylidene-2-norbornene, cyclooctatriene and so on.

Polymerization in the present invention can be conducted by any polymerization method such as slurry polymerization, solution polymerization, gas phase polymerization or the like. Slurry polymerization and gas phase polymerization are particularly preferred.

In the case of practicing the solution polymerization or slurry polymerization in the present invention, an inert hydrocarbon solvent or an olefin itself that is subjected to polymerization can be used as a solvent. Examples of the inert hydrocarbon solvent include aliphatic hydrocarbons such as butane, isobutane, pentane, hexane or octane; alicyclic hydrocarbons such as cyclopentane, methyl cyclopentane or cyclohexane; aromatic hydrocarbons such as benzene, toluene or xylene; and petroleum fractions such as naphtha, kerosine or light oil, etc.

The polymerization temperature in practicing the polymerization of the present invention is generally −20 to 100° C., preferably 20 to 90° C. in the case of slurry polymerization and normally 0 to 120° C., preferably 20 to 100° C., in the case of gas phase polymerization. Further, in the case of solution polymerization, the polymerization temperature is normally 0 to 300° C., preferably 100 to 250° C.

The polymerization pressure is not particularly limited, but is normally in a range of atmospheric pressure to 10 MPa.

The polymerization of the present invention can be conducted in any of batchwise, semi-continuous and continuous manner. It is also possible to conduct the polymerization by dividing into two stages or more having different reaction conditions. Molecular weight of the olefin polymer obtained can be controlled by allowing hydrogen to exist in the polymerization reaction system or changing the polymerization temperature.

When the solid catalyst (D) of the present invention thus obtained is used, the polymer produced generally has a narrow molecular weight distribution, and in the case of copolymerization, the copolymer produced has uniform monomer composition.

BEST MODE FOR CARRYING OUT THE INVENTION

The present invention is described in more detail with reference to the following examples, but the invention is not limited thereto.

Methods of measuring physical properties in the examples are as follows.

Molecular Weight and Molecular Weight Distribution:

Weight average molecular weight (Mw) and number average molecular weight (Mn) were obtained by measuring at 135° C. using 1,2,4-trichlorobenzene as a solvent with a gel permeation chromatography (150C, manufactured by Waters Co.). Ratio of Mw to Mn was obtained and the ratio was used as an index of a molecular weight distribution.

Content of Hexene-1:

1-Hexene content of copolymer was determined by $^{13}$C-NMR spectra recorded using a BURUKER AM-400 spectrometer (100 MHz) in o-dichlorobenzene-d4 at 125° C.

$^1$H-NMR measurement of metallocene compound:

Metallocene compounds were identified on basis of $^1$H-NMR spectroscopy measured using a BURUKER AM-400 spectrometer (400 MHz) in benzene-d6 at room temperature.

EXAMPLE 1

(1) Preparation of Magnesium-containing Solid Component (A)

1.52 g of magnesium dichloride hexahydrate ($MgCl_2.6H_2O$) previously dried at 70° C. for 3 hours under reduced pressure was placed on a porcelain calcinating dish and calcined at 200° C. for 1.5 hours under nitrogen gas stream to obtain 0.77 g of magnesium-containing solid component. As a result of analyzing magnesium (Mg) and chlorine (Cl) in the solid component obtained, it was found to be 31.6 wt % and 49.0 wt %, respectively. Therefore, a Cl/Mg ratio (gram atomic ratio) was 1.06. This solid component was ground with a ball mill for 20 minutes, and the resulting powder was used in the next reaction.

(2) Preparation of Solid Catalyst (D) for Polymerization 0.101 g of the magnesium-containing solid component (A) prepared in above (1) and 20 ml of toluene were charged in a glass reactor, which had been sufficiently dried and substituted with nitrogen and cooled to 0° C. On the other hand, 1.3 ml (2.6 mg atom Al) of methyl aluminoxane (EURECEN Al 5100/10T manufactured by Witco Co., was dried up and re-dissolved in toluene) as an organoaluminum-oxy compound (B) was introduced into a dropping funnel, and then gradually added dropwise to the reactor. Stirring was continued for 30 minutes and the temperature in the reactor was returned to room temperature. 3.4 ml (0.0021 mmol) of a toluene solution of bis(n-butylcyclopentadienyl) zirconium dichloride (EURECEN 5031 manufactured by Witco Co.) as a metallocene compound (C) was added to the reactor to conduct reaction at 80° C. for 1 hour. The contents in the reactor were cooled to room temperature and then sufficiently washed with toluene. A slurry thus obtained was distilled to remove toluene as much as possible, and n-hexane was added to obtain a hexane suspension of a solid catalyst (D) for polymerization.

(3) Copolymerization of Ethylene and Hexene-1

300 ml of n-hexane and 5 ml of hexene-1 were charged in a 800 ml stainless autoclave the inside of which had been dried and substituted with ethylene, and the temperature was elevated to 50° C. 0.5 mmol of triisobutyl aluminum and 5.5 mg of the solid catalyst obtained in above (2) were successively added to the autoclave. The temperature was elevated to 70° C. and polymerization was then conducted under a polymerization pressure of 0.735 MPa for 1 hour while continuously introducing ethylene. After completion of the polymerization, a polymer formed was separated from the solvent and dried to obtain 38.4 g of white powdery ethylene copolymer.

In this case, catalyst activity of the polymerization was calculated to show a high activity of 7.0 kg PE/g Cat. The copolymer obtained had a molecular weight (Mw) of 207,000, and Mw/Mn which is an index of a molecular weight distribution was 2.1. Therefore, the copolymer obtained had narrow molecular weight distribution. Further, the copolymer obtained had a hexene-l content of 0.41 mol %.

EXAMPLES 2 AND 3

(1) Preparation of Magnesium-containing Solid Component (A)

A magnesium-containing solid component (A) was prepared in the same manner as in Example 1–(1) except that the calcination time of magnesium dichloride hexahydrate was changed to 45 minutes (Example 2) and to 4.5 hours (Example 3). The Cl/Mg ratio (gram atomic ratio) was 1.42 and 0.63, respectively.

(2) Preparation of Solid Catalyst (D) for Polymerization

A solid catalyst (D) for polymerization was prepared in the same manner as in Example 1–(2) using each magnesium-containing solid component (A) obtained above.

(3) Copolymerization of Ethylene and Hexene-1

Copolymerization of ethylene and hexene-1 was conducted in the same manner as in Example 1–(3) except that the amount of the solid catalyst (D) for polymerization used was changed as shown in Table 1 below. The results obtained are shown in Table 1.

TABLE 1

|  | Example 1 | Example 2 | Example 3 |
|---|---|---|---|
| Cl/Mg ratio (gram atomic ratio) | 1.06 | 1.42 | 0.63 |
| Amount of solid catalyst (D) used (mg) | 5.5 | 5.7 | 6.1 |
| Yield of polymer (g) | 38.4 | 33.1 | 32.9 |
| Catalyst activity (kg PE/g Cat) | 7.0 | 5.8 | 5.4 |
| Mw (×10$^{-3}$) | 207 | 210 | 208 |
| Mw/Mn | 2.1 | 2.1 | 2.1 |

COMPARATIVE EXAMPLE 1

(2) Preparation of Solid Catalyst for Polymerization

A solid catalyst for polymerization was prepared by reacting the magnesium-containing solid component(A) with the organoaluminum-oxy compound (B) and the metallocene compound (C) in the same manner as in Example 1–(2) except that anhydrous magnesium dichloride which was ground to the size passed through 100 mesh under nitrogen atmosphere and then dried at 70° C. for 3 hours under reduced pressure was used as the magnesium-containing solid component (A).

(3) Copolymerization of Ethylene and Hexene-1

Polymerization was conducted in the same manner as in Example 1–(3) except for the use of 17.4 mg of the solid catalyst for polymerization obtained in above (2). As a result, 11.6 g of white powdery ethylene copolymer was obtained. The catalyst activity in this case was so low a value of 0.67 kg PE/g Cat. Further, the copolymer obtained had a hexene-1 content of 0.40 mol %.

COMPARATIVE EXAMPLE 2
(2) Preparation of Solid Catalyst for Polymerization

A solid catalyst for polymerization was prepared by reacting the magnesium-containing solid component(A) with the organoaluminum-oxy compound (B) and the metallocene compound (C) in the same manner as in Example 1–(2) except that magnesium hydroxide which was dried at 70° C. for 3 hours under reduced pressure was used as the magnesium-containing solid component (A).

(3) Copolymerization of Ethylene and Hexene-1

Polymerization was conducted in the same manner as in Example 1–(3) except for the use of 22.6 mg of the solid catalyst for polymerization obtained in above (2). As a result, 6.2 g of ethylene copolymer was obtained. The catalyst activity in this case was so low a value of 0.27 kg PE/g Cat. Further, the copolymer obtained had a hexene-1 content of 0.40 mol %.

EXAMPLE 4
(1) Synthesis of Bis(n-butylcyclopentadienyl)Bis(3-trifluoromethylphenoxy)Zirconium 78.9 mg of 3-trifluoromethylphenol was added to 10 ml of a toluene solution of 88.2 mg of bis(n-butylcyclopentadienyl) zirconium dimethyl, and the resulting mixture was stirred at room temperature for 1 hour. After completion of the reaction, toluene (solvent) was distilled off under reduced pressure to obtain 159.8 mg of colorless oily product. The yield was 100%.

By $^1$H-NMR measurement and elemental analysis, the product obtained was confirmed to be the intended metallocene compound. The results are shown below.

Result of $^1$H-NMR measurement: δ 0.77 (t, 6H, J=7.3 Hz), 1.11 (sext, 4H, J=7.5 Hz), 1.28 (quint, 4H, J=7.8 Hz), 2.27 (t, 4H, J=7.8 Hz), 5.75–5.79 (m, 8H), 6.78 (m, 2H, J=7.7 Hz), 7.01–7.08 (m, 4H).

Result of elemental analysis: C 58.84, H 5.36, Zr 13.74 wt %

(2) Preparation of Solid Catalyst (D) for Polymerization

A solid catalyst (D) for polymerization was prepared in the same manner as in Example 1–(2) except for the use of bis(n-butylcyclopentadienyl)bis(3-trifluoromethylphenoxy) zirconium obtained above as the metallocene compound (C).

(3) Copolymerization of Ethylene and Hexene-1

Copolymerization of ethylene and hexene-1 was conducted in the same manner as in Example 1–(3). As a result, 39.7 g of white powdery ethylene copolymer was obtained.

Catalyst activity of the polymerization in this case was as high as 7.2 kg PE/g Cat. Further, the copolymer obtained had a molecular weight (Mw) of 199,000, and Mw/Mn was 2.2. The copolymer had a hexene-1 content of 0.40 mol %.

EXAMPLE 5
(2) Preparation of Solid Catalyst (D) for Polymerization

A solid catalyst (D) for polymerization was prepared in the same manner as in Example 1–(2) except for the use of bis(1,2,4-trimethylcyclopentadienyl)zirconium dichloride as the metallocene compound (C).

(3) Copolymerization of Ethylene and Hexene-1

Copolymerization of ethylene and hexene-1 was conducted in the same manner as in Example 1–(3). As a result, 29.8 g of white powdery ethylene copolymer was obtained. Catalyst activity in this case was 5.4 kg PE/g Cat.

The copolymer obtained had a molecular weight (Mw) of 420,000, and Mw/Mn was 2.4. The copolymer had a hexene-1 content of 0.40 mol %.

EXAMPLE 6
(2) Preparation of Solid Catalyst (D) for Polymerization

A solid catalyst (D) for polymerization was prepared in the same manner as in Example 1–(2) except for the use of bis(n-butylcyclopentadienyl)hafnium dichloride as the metallocene compound (C) and 0.12 mmol and 46 mg atom (A1), per 1 g of the magnesium-containing solid component (A), of the metallocene compound (C) and the organoaluminum-oxy compound (B), respectively.

(3) Copolymerization of Ethylene and Hexene-1

Copolymerization of ethylene and hexene-1 was conducted in the same manner as in Example 1–(3) except for the use of 20 mg of the solid catalyst (D) for polymerization obtained above. As a result, 38.7 g of white powdery ethylene copolymer was obtained.

Catalyst activity in this case was 1.94 kg PE/g Cat.

The copolymer obtained had a molecular weight (Mw) of 858,000, and Mw/Mn was 2.5. The copolymer had a hexene-1 content of 0.38 mol %.

EXAMPLE 7
(3) Polymerization of Ethylene

Polymerization of ethylene was conducted in the same manner as in Example 1–(3) except that the solid catalyst (D) for polymerization prepared in Example 1–(2) was used and that hexene-1 was not added. As a result, 42.0 g of white powdery polyethylene was obtained. Catalyst activity in this case was 7.6 kg PE/g Cat. The polyethylene obtained had a molecular weight (Mw) of 215,000, and Mw/Mn was 2.1.

In the case where the solid catalyst for olefin polymerization according to the present invention is used, catalyst activity, particularly activity per solid catalyst, is high. Therefore, catalyst cost is inexpensive and a deashing treatment step such as catalyst removal can be omitted.

The olefinic polymer produced has a narrow molecular weight distribution, and in the case of a copolymer, its monomer composition is uniform.

What is claimed is:

1. A solid catalyst (D) for olefin polymerization, comprising a magnesium-containing solid component (A) carrying thereon an organoaluminum-oxy compound (B) and a metallocene compound (C), said magnesium-containing solid component (A) having a gram atomic ratio of halogen to magnesium (halogen/magnesium) of 0.3 to 1.7 and being obtained by heat treating a magnesium compound of the general formula:

$$MgX_2 \cdot nH_2O$$

where X represents a halogen atom and n is an integer of 1 to 12.

2. A solid catalyst (D) for olefin polymerization as claimed in claim 1, wherein said metallocene compound (C) is a compound of the following general formula (3) or (4):

$$(R^5_eCP)_m(R^6_fCp)_nM(Y)_{4-(m+n)} \qquad (3)$$

where M represents titanium, zirconium or hafnium, Cp represents a group having a cyclopentadienyl skeleton, $R^5$ and $R^6$ each represents hydrogen atom, an alkyl group, an alkenyl group, an aryl group, an alkylaryl group, an arylalkyl group or an alkylsilyl group, Y represents a halogen atom, hydrogen atom, a hydrocarbon group, a silyl group, a halogenated hydrocarbon group, a nitrogen-containing organic group, an oxygen-containing organic group or a sulfur-containing organic group, e and f is each an integer of 0 to 5, and m and n is each an integer of 0 to 3, provided that m+n is an integer of 1 to 3;

$$R'(R^5_g Cp)(R^6_h CP)M(Y)_2 \qquad (4)$$

where M represents titanium, zirconium or hafnium, Cp represents a group having a cyclopentadienyl skeleton, $R^5$ and $R^6$ each represents hydrogen atom, an alkyl group, an alkenyl group, an aryl group, an alkylaryl group, an arylalkyl group or an alkylsilyl group, R' represents a divalent group which links $(R^5_g Cp)$ and $(R^6_h CP)$, selected from an alkylene group, an arylalkylene group, a dialkylsilylene group, a dialkylgermylene group, an alkylphosphinediyl group, an alkylimino group or an alkylboranediyl group, Y represents a halogen atom, hydrogen atom, a hydrocarbon group, a silyl group, a halogenated hydrocarbon group, a nitrogen-containing organic group, an oxygen-containing organic group or a sulfur-containing organic group, g and h is each an integer of 0 to 4.

3. A solid catalyst (D) as claimed in claim 1, wherein said halogen is selected from the group consisting of chlorine, bromine and iodine.

4. A solid catalyst (D) as claimed in claim 1, wherein said heat treatment is at a temperature of from 100 to 500° C. for from 0.1 to 10 hours.

5. A solid catalyst (D) as claimed in claim 4, wherein said heat treatment is at a temperature of from 150 to 300° C.

6. A solid catalyst (D) as claimed in claim 4, wherein said heat treatment is conducted for from 0.5 to 4 hours.

7. A method for producing an olefinic polymer, wherein an olefin is homopolymerized or copolymerized in the presence of the solid catalyst (D) for olefin polymerization as claimed in claim 1 and an organoaluminum compound (E).

8. A method as claimed in claim 7, wherein said halogen is selected from the group consisting of chlorine, bromine and iodine.

9. A method as claimed in claim 7, wherein said heat treatment is at a temperature of from 100 to 500° C. for from 0.1 to 10 hours.

10. A method as claimed in claim 9, wherein said heat treatment is at a temperature of from 150 to 300° C.

11. A method as claimed in claim 9, wherein said heat treatment is conducted for from 0.5 to 4 hours.

12. A method for producing an olefinic polymer, wherein an olefin is homopolymerized or copolymerized in the presence of the solid catalyst (D) for olefin polymerization as claimed in claim 2 and an organoaluminum compound (E).

* * * * *